United States Patent [19]
Olson et al.

[11] Patent Number: 5,532,673
[45] Date of Patent: Jul. 2, 1996

[54] FUEL FILL MONITORING SYSTEM AND METHOD

[75] Inventors: Daniel E. Olson, Manitoba, Canada; David G. Sokol, New Holland, Pa.; Kevin Walker, Manitoba, Canada

[73] Assignee: New Holland North America, Inc., New Holland, Pa.

[21] Appl. No.: 437,973

[22] Filed: May 10, 1995

Related U.S. Application Data

[63] Continuation of Ser. No. 209,711, Mar. 14, 1994, abandoned.

[51] Int. Cl.$^6$ ........................................... B60Q 1/00
[52] U.S. Cl. ........................ 340/450.2; 340/450.3; 340/623; 340/618; 340/525; 340/616
[58] Field of Search .......................... 340/623, 618, 340/525, 616, 450.2, 450.3

[56] References Cited

U.S. PATENT DOCUMENTS

| | | | |
|---|---|---|---|
| 4,229,798 | 10/1980 | Rosie et al. | 364/564 |
| 4,684,917 | 8/1987 | Thurman | 340/618 |
| 4,908,783 | 3/1990 | Maier | 340/618 |
| 4,918,628 | 4/1990 | Griffen et al. | 340/623 |
| 4,949,070 | 8/1990 | Wetzel | 346/450.3 |
| 5,225,813 | 7/1993 | Raub, Sr. | |

*Primary Examiner*—Brent A. Swarthout
*Assistant Examiner*—Ashok Mannava
*Attorney, Agent, or Firm*—Griffin, Butler, Whisenhunt & Kurtossy

[57] ABSTRACT

The fuel tank of a mobile vehicle is provided with a level sensor for sensing the level of fuel in the tank as it is being filled. The output signal from the level sensor is applied to a microprocessor which in turn provides output signals to drive an audible alarm and a visual display. The microprocessor determines the level of fuel in the tank from the signal produced by the level sensor and drives the audible alarm to provide a first sound pattern, such short beeps or tones when the tank is at least ¾ full but less than ⅞ full and a second sound pattern such as a continuous tone when the tank is at least +e,fra 7/8+ee full. The microprocessor also drives a visual display to display text messages indicating the level of fuel in the tank. A vehicle operator may initiate filling of the tank and attend to other service on the vehicle, leaving the fill operation unattended. The first sound pattern warns the operator that he must soon give his full attention to the fill operation. The continuous tone warns the operator that the fill operation has progressed to a stage where he must carefully observe and control further fuel input. This reduces the likelihood of fuel loss due to overfill or back-splash resulting from trapped air in the tank.

10 Claims, 5 Drawing Sheets

FUEL FILL MONITORING SYSTEM AND METHOD

This application is a continuation of U.S. patent application Ser. No. 08/209,711, filed Mar. 14, 1994, now abandoned.

FIELD OF THE INVENTION

This invention relates to a method and apparatus for monitoring the filling of fuel tanks on mobile self-powered equipment such as tractors, and signalling an operator as fuel in the tank reaches a level at which further filling should be closely observed and controlled by the operator.

BACKGROUND OF THE INVENTION

The fuel tanks on some tractors have an odd shaped geometry in order to take advantage of every usable cubic inch of space, thereby providing maximum volume for fuel storage. The odd shaped geometry may result in the trapping of air pockets in a tank as it is being filled, and the air pockets may cause fuel pressure splash-back particularly as the fuel level in the tank approaches the full condition. This results in the loss of expensive fuel and harm to the environment.

Other tractors have fuel tanks which, although rectangular in shape, are of large capacity and accordingly pumps having high fuel transfer rates are used to fill them. Refueling with these pumps should be closely monitored to prevent over-fill and the dispersion of costly fuel into the environment. However, experience has shown that there is a tendency on the part of tractor operators to start a fill operation and then leave it unattended while performing other service on the tractor, intending to return before the tank is full. This is particularly true of slow-fill operations (gravity feed) and sometimes true of fast-fill (pumped) operations where a typical tank with a capacity in excess of 200 gallons may take 3–5 minutes to fill. An operator frequently over-estimates the required fill time and this results in a considerable volume of fuel being spilled onto the ground, particularly if it is being pumped.

SUMMARY OF THE INVENTION

A principle object of the present invention is to provide a fuel tank fill monitoring system which permits unattended filling of the tank until the tank approaches a near full condition, and provides an indication to the operator when he should closely observe and control further filling of the tank.

An object of the invention is to provide a monitoring method and system for monitoring the filling of fuel tanks and providing audible and visual indications of the status of the fill operation to an operator.

Another object of the invention is to provide a fuel tank fill monitoring system which produces first and second sound patterns indicating progress of the fill operation.

A further object of the invention is to provide a fuel fill monitoring system for monitoring the filling of a tank with fuel, the system comprising a sensor for sensing the level of fuel in the tank and producing an output signal indicating the level; an audible alarm; first means responsive to the output signal for determining the level of fuel in the tank; and, second means responsive to the first means for applying a first energizing signal to the audible alarm to produce a first sound pattern as long as the level of fuel in the tank is above a first level but below a second level and applying a second signal, different from the first signal to the audible alarm to produce a second sound pattern as long as the level of fuel is at least as high as the second level.

Another object of the invention is to provide a fuel fill monitoring system as described above wherein the first signal comprises a plurality of pulses spaced in time and the second signal is a continuous pulse.

Still another object of the invention is to provide a fuel fill monitoring system as described above wherein the first signal comprises a plurality of groups of pulses, the pulses within a group being spaced by a first interval of time and a first pulse of the second and succeeding groups of pulses being separated from a last pulse of a preceding group by a second interval of time different from the first interval of time.

A further object of the invention is to provide a method of monitoring a fuel tank fill operation, the method providing an operator with audible indications of progress of the fill operation and when the fill operation has proceeded to a point where further filling should be closely observed.

Still another object of the invention is to provide a fuel tank fill monitoring system which provides to an operator first visual indications indicating that the fuel level in the tank has reached a first level and a second visual indication when the fill operation has proceeded to the point where further filling should be closely observed and controlled by the operator.

In accordance with the principles of the present invention, a fuel level sensor disposed within a tank provides an output signal to a microprocessor which processes the signal and provides output signals to an audible alarm and a visual display. The microprocessor energizes the audible alarm to produce a first sound pattern comprising groups of short beeps when the fill operation is in an advanced stage, such as when the tank is ¾ full, and a second sound pattern comprising a continuous tone when the tank has been filled to seven-eighths of its capacity. Concurrently with the first sound pattern the visual display is energized to display a flashing message "FUEL ¾" and concurrently with the second sound pattern the display is energized to display the flashing message "FUEL FULL".

Other objects of the invention, its advantages and mode of operation, will become apparent from consideration of the following description and the accompanying drawing.

DESCRIPTION OF A PREFERRED EMBODIMENT

Figure 1:
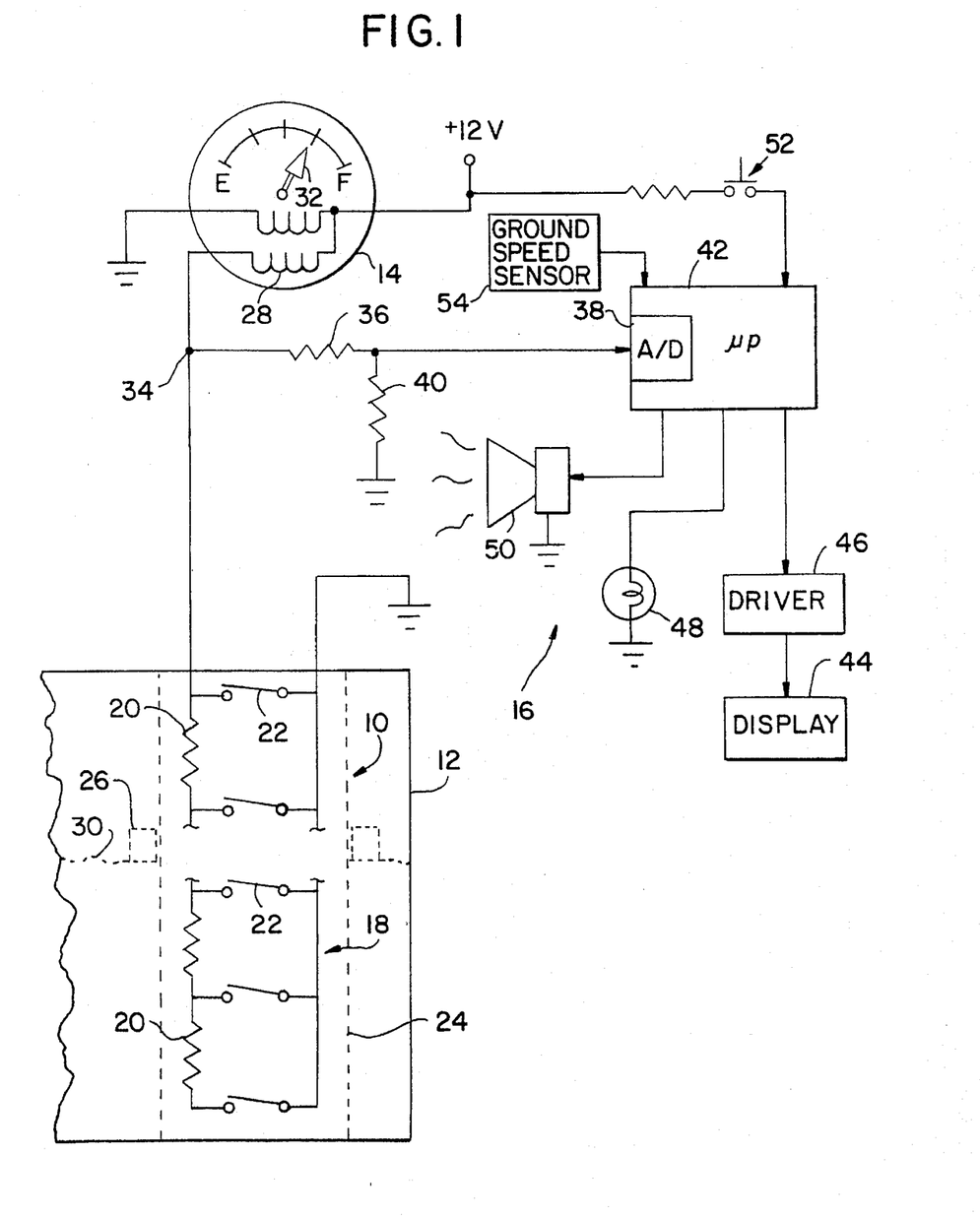
FIG. 1 is a schematic diagram of a microprocessor-based fuel tank fill monitoring system having a sound pattern generator and a display for visually displaying messages.

As illustrated in FIG. 1, a fuel fill monitoring system comprises a liquid level sensor 10 disposed within a fuel tank 12, a visual fuel gauge 14 and a processor and display system 16.

The liquid level sensor is of conventional design and comprises a ladder network 18 of resistors 20 and switch contacts 22 disposed within a sealed housing 24, and a magnetic float 26 which surrounds the housing. The ladder network 18 is connected to ground at one side and at the other side it is connected to the vehicle battery through a coil 28 of the gauge 14.

The magnetic float 26 floats on the surface of fuel 30 in the tank and as the float rises (or falls) it closes (or opens) successive ones of the contacts 22. Gauge 14 is driven by the current flowing in a series circuit which extends from the positive side of the battery through coil 28, one or more of resistors 20 and the contact actuated by the float, to ground. As the float 26 rises it closes a successively higher switch contact (as viewed in FIG. 1) thereby effectively removing from the series circuit all resistors below that contact. As the resistors are removed, the current through coil 28 rises in increments thereby driving the gauge indicator needle 32 in increments further toward the "full" mark.

The increments by which current flow through coil 28 increases as the fuel level rises is determined by the number of resistors 20. The maximum error in the indication provided by gauge 14 decreases as the number of resistors increases. In a typical embodiment the sensor 10 may have 32 resistors.

As resistors 20 are added to, or removed from the series circuit, the voltage at junction point 34 increases decreases. The junction point 34 is connected through a resistor 36 to an analog to digital converter (ADC) 38, and through a resistor 40 to ground. The ADC 38 converts the analog voltage appearing at the junction of resistors 36 and 40 into a digital value representing the voltage. This digital value thus represents the indicated fuel level in tank 12 where the indicated fuel level is defined as the fuel level of the contact 20 currently actuated by float 26.

The ADC 38 is associated with a programmable microprocessor 42. Many commercially available tractors include a microprocessor controlled instrumentation package for monitoring tractor performance and indicating system status, and the processor of this package may serve as the microprocessor 42. The instrumentation package further includes a liquid crystal display 44 driven by the microprocessor through a set of drivers 46, a low-fuel indicator lamp 48 and a beeper or audible alarm 50.

The instrumentation package further includes a conventional ground speed sensor 54. This sensor produces a sequence of pulses having a frequency proportional to the ground speed of the vehicle. Microprocessor 42 counts pulses over fixed intervals of time and at the end of each interval the count is stored at location GRND_SPD and the counter is reset.

In accordance with the present invention, the program of microprocessor 42 is modified to provide a fuel fill monitoring routine. During execution of this routine the microprocessor repeatedly samples the digital indication produced by ADC 38 to determine the indicated fuel level. When the indicated fuel level indicates that the tank 12 is three-quarters full, the microprocessor begins sending a signal comprising a sequence of pulses to beeper 50 so that it generates a first sound pattern. The pulses turn the beeper on for 0.25 sec., off for 0.25 sec., on for 0.25 sec. and off 0.75 sec. The sequence is then repeated. The LCD display 44 is also energized by microprocessor 42 through drivers 46 to repeatedly flash a message. The message comprises the words "FUEL", "¾" and "   " (blank) displayed sequentially in time for 0.5 sec. intervals each.

When the indicated fuel level indicates that the tank is seven-eighths full, the microprocessor sends a continuous pulse to beeper 50 so that it generates a continuous sound. At the same time, the microprocessor applies signals through drivers 46 to display a second message on the display 44. This message comprises the words "FUEL", "FULL" and "   " displayed sequentially and for 0.5 sec. each.

Figure 2:
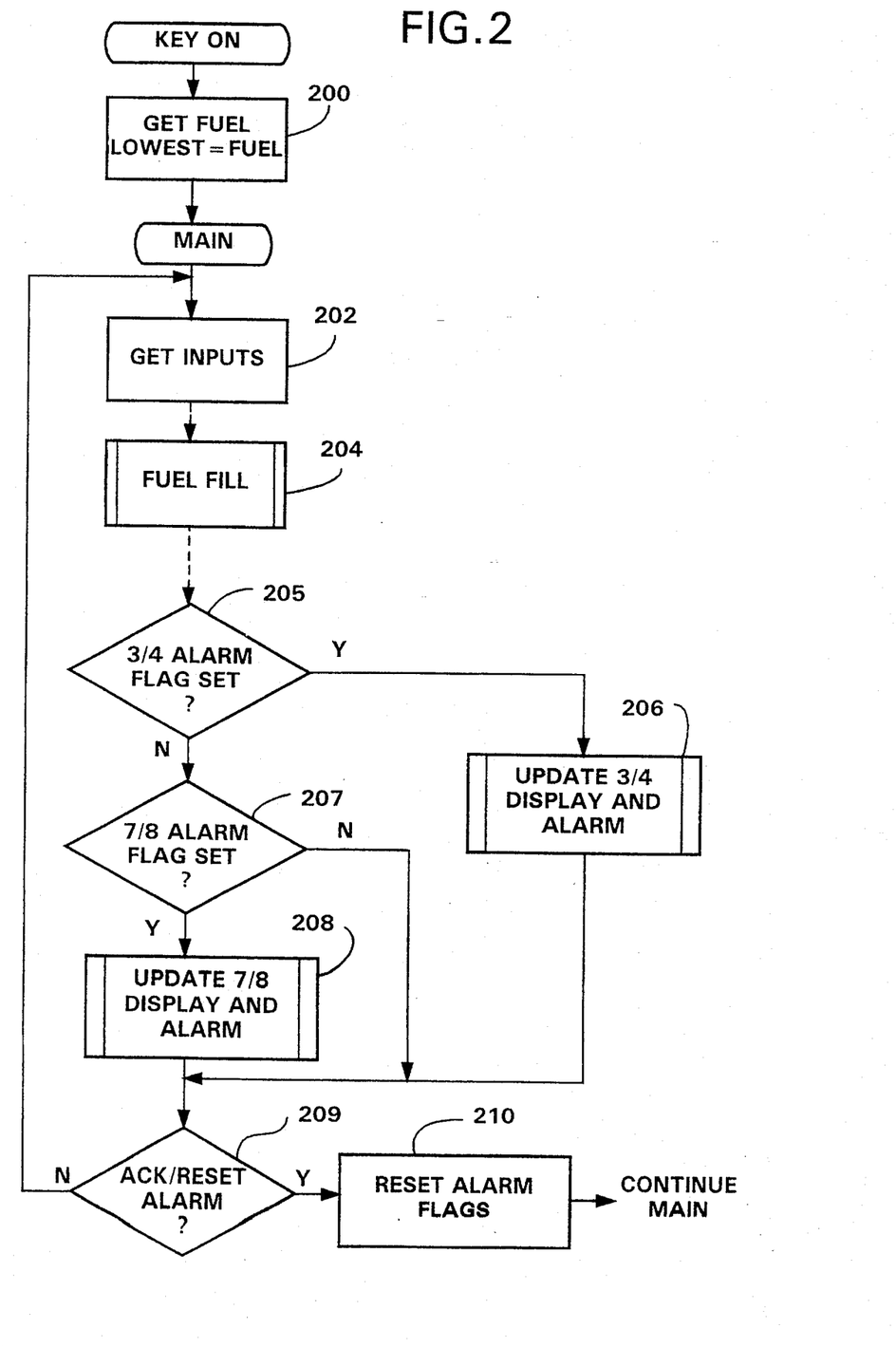
FIG. 2 is a flow chart of a part of a MAIN program executed by an instrumentation microprocessor.

FIG. 2 shows that portion of the MAIN program relevant to the present invention. When an ignition key (not shown) is turned on to supply power to microprocessor 42, the microprocessor performs a power-up reset to reset various flags and counters and perform certain housekeeping functions. One of these functions is to sample ADC 38 to determine the level of fuel in tank 12. A value representing the fuel level is stored in a memory location LOWEST at step 200 before the microprocessor enters the MAIN program.

At step 202 the microprocessor samples various switches including an ACK/RESET pushbutton switch 52 (FIG. 1). As described below, this switch provides a means for an operator to reset any alarm sounded when the fuel level rises above the ¾ level during a fuel fill operation. The switch is located on a control panel within the operator's compartment of the vehicle.

Next, the microprocessor executes a GET A/D routine to sample various analog inputs representing the condition or status of the vehicle. As part of the GET A/D routine the microprocessor executes the FUEL FILL subroutine 204.

Figure 3A:
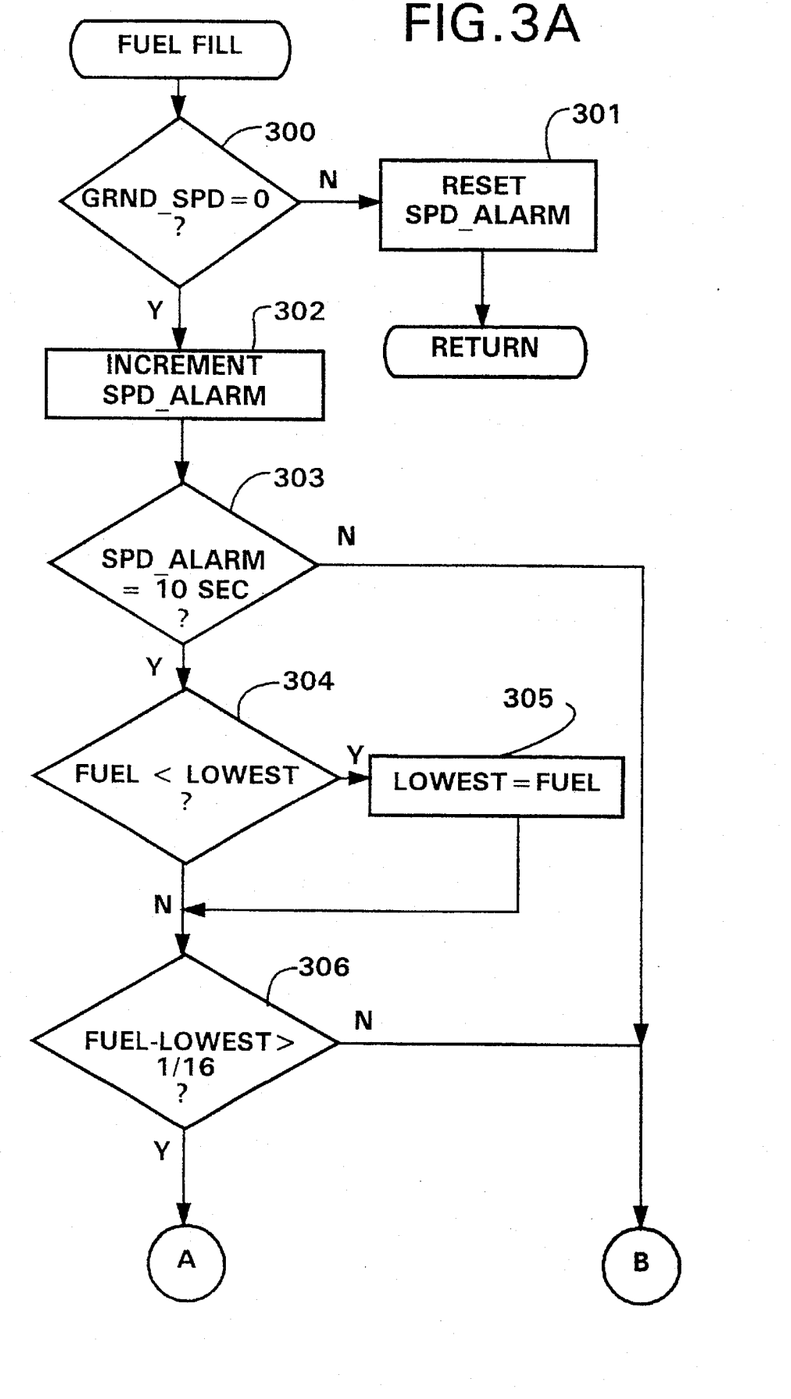
FIGS. 3A and 3B comprise a flow chart of the fuel fill routine executed by the microprocessor; and, FIG. 4 is a flow chart of the routine for updating the display and alarm while the fuel tank is at least ¾ but less than ⅞ full.
Figure 3B:
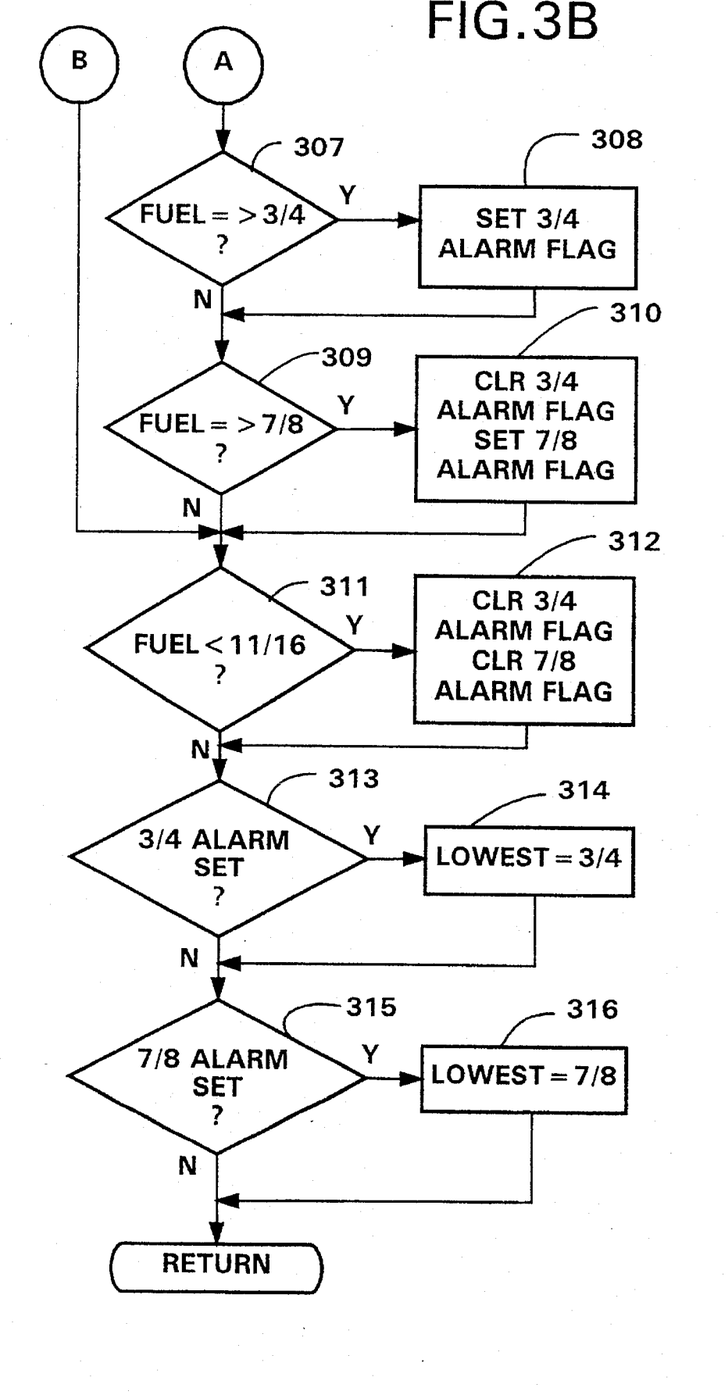

FIGS. 3A and 3B illustrate the FUEL FILL subroutine. At step 300 the output of the ground speed sensor 54 (FIG. 1) is sampled to see if the vehicle is moving. If the vehicle is moving then a fuel fill operation is not being performed. A timer SPD_ALARM is reset at step 301 and the program returns to the MAIN routine (FIG. 2) to execute the next step, shown as step 205.

If the vehicle is not moving, the test at step 300 proves true and the timer SPD_ALARM is incremented at step 302 and tested at step 303. SPD_ALARM times 10 sec intervals. Its purpose is to insure that the vehicle is stopped, and to allow time for the fuel in tank 12 to cease "sloshing" if the vehicle has been moving.

If the test at step 303 shows that the vehicle has not been stopped for 10 sec, the subroutine advances to step 311 (FIG. 3B) where the output of ADC 38 is tested to see if the fuel level is less than 11/16. If it is, a ¾ alarm flag and a ⅞ alarm flag are reset at step 312 before proceeding to step 313. If the fuel level is greater than 11/16 then the program advances directly from step 311 to step 313.

The ¾ alarm flag is tested at step 313 and the ⅞ alarm flag is tested at step 315. Assuming both flags are reset (they are reset during the power up reset) the value in LOWEST is not changed and a return is made to the next step (205) of the MAIN routine.

The ¾ alarm flag is tested at step 205 and the ⅞ alarm flag is tested at step 207. Since both alarm flags are reset the routine advances to step 209 where an ACK/RESET flag is tested. This flag is set if the operator is depressing the pushbutton switch 52 at the time step 202 is executed. Assuming the operator has not actuated the switch, the test proves false and the program returns to step 202.

Steps 202, 204, 205, 207 and 209 are repeatedly executed and each time the FUEL FILL routine is executed the timer SPD_ALARM is incremented at step 302 and tested at step 303. Ten seconds after the ignitions key is turned on, or 10 seconds after the vehicle is stopped if it has been moving, the test at step 303 proves true.

The output of ADC 38 is sampled at step 304 and the present fuel level is compared with the fuel level stored in LOWEST. If the fuel level has dropped below the level stored in LOWEST at step 200 then LOWEST is set at step 305 to the current fuel level. The reason for this is as follows. Suppose that after the ignition is turned on and before the 10 sec interval tolled by SPD_ALARM has elapsed, the operator places the tractor in gear and it begins moving, thereby consuming fuel. When the tractor is again stopped, the fuel level will be less than the level stored in LOWEST at step 200. A similar condition can occur if the operator should leave the tractor in neutral with the engine running so as to consume fuel. Steps 304 and 305 allow the stored value in LOWEST to be updated before the monitoring steps of the fuel fill routine are carried out.

After step 304 or 305 is completed, step 306 subtracts the fuel level stored in LOWEST from the current fuel level to determine if the current level is greater than LOWEST by a value greater than 1/16th the capacity of tank 12. This should be true only if fuel is being added to the tank. Assuming fuel is not being added, the test at step 306 proves false. The subroutine jumps to step 311 and continues through steps 313, 315, 205, 207 and 209 as previously described. As long as the ignition remains on, the vehicle does not move, the operator does not press the ACK/RESET pushbutton and no fuel is added to the tank, the MAIN program is repeatedly executed. During each execution, steps 300, 302–306, 311, 313 and 315 of the FUEL FILL subroutine are carried out and, if the current fuel level is less than 11/16ths of tank capacity step 312 is also executed.

Assume now that the operator begins filling the tank. The microprocessor continues executing the MAIN program as described in the preceding paragraph until a sufficient quantity of fuel has been added to the tank so that the current fuel level is greater than LOWEST by an amount equal to 1/16th of the tank capacity. When this condition is detected at step 306 the program moves to step 307 where the current fuel level is tested to see if the tank is at least 3/4 full. Assume for the moment that the tank is less than 3/4 full. The current fuel level is then tested at step 309 to determine if the tank is 7/8ths full. Under the assumed conditions the test at step 309 proves false and the program advances to step 311. From step 311 the microprocessor proceeds as previously described.

While the tank is being filled, the microprocessor repeatedly executes step 200, 202–205 and 207–209 and when the FUEL FILL subroutine is executed steps 300, 302–304, 309, 311, 313 and 315 are performed. During this time steps 307 and 309 will be executed once each time the fuel level increases by 1/16th the tank capacity. This continues until the tank is 3/4 full. The 3/4 full condition is detected at step 307 and the 3/4 alarm flag is set at step 308. The fuel level is still less than the 7/8ths level but greater than the 11/16ths level so the tests at step 309 and 311 prove false. When step 313 is performed it finds the 3/4 alarm flag set so step 314 is executed to set LOWEST to indicate the 3/4 level. The 7/8 alarm flag is not set (step 315) so a return is made to step 205 of the MAIN program with the 3/4 alarm flag set. Therefore, when step 205 tests the flag it finds it set and the program branches to an Update 3/4 Display and Alarm routine (step 206). As subsequently explained, the update routine causes the sounding of the audible alarm 50 in a specific sound pattern and also causes the flashing of a visual message on display 44.

The 3/4 alarm flag remains set until the tank is 7/8ths full. During this interval the test at step 306 will show that the current fuel level is not greater than the value stored in LOWEST at step 314 by more than 1/16th the tank capacity so steps 307 and 309 are not executed.

When the tank has been filled to the 7/8th level, the test at step 306 will again prove true. The test at step 307 proves true and step 308 sets the 3/4 alarm flag. Actually, the flag is still set. Step 309 proves true because the tank is now 7/8 full. The 3/4 alarm flag is cleared and the 7/8 alarm flag is set at step 310.

Since the tank is 7/8ths full and the 3/4 alarm flag is reset, the tests at steps 311 and 313 prove false but when step 315 tests the 7/8 alarm flag and finds it set step 316 is executed to set LOWEST to a value representing the 7/8ths level. A return is then made to the MAIN routine with the 7/8 alarm flag set and the 3/4 alarm flag reset.

Upon the return to the MAIN routine, the test of the 3/4 alarm flag (step 205) finds that the flag is no longer set so the 7/8 alarm flag is tested at step 207. Since the 7/8 alarm flag is set, the Update 7/8 Display and Alarm routine (step 208) is executed to begin sounding the audible alarm 50 and displaying the word "FUEL" on the display 44. After the microprocessor executes the updating routine the ACK/RESET alarm flag is tested at step 209 and assuming the operator has not pressed pushbutton 52 the test will prove false and the program loops back to step 302.

At this point the operator may continue filling the tank, while closely watching for the tank to reach the full mark. Meanwhile, the audible alarm 50 is continuously sounding and the display 44 is displaying the words "FUEL", "FULL" and "    " in a repetitive sequence.

The operator may terminate the monitoring operation at any time, regardless of the level of fuel in the tank, by depressing the ACK/RESET pushbutton switch 52. Actuation of the switch is detected the next time step 202 is executed and the ACK/RESET alarm flag is set. When the flag is subsequently tested at step 209, the program branches to step 210 to turn off the 3/4 or 7/8 alarm flag (if on). The microprocessor program then advances to the next step of the MAIN routine.

Figure 4:
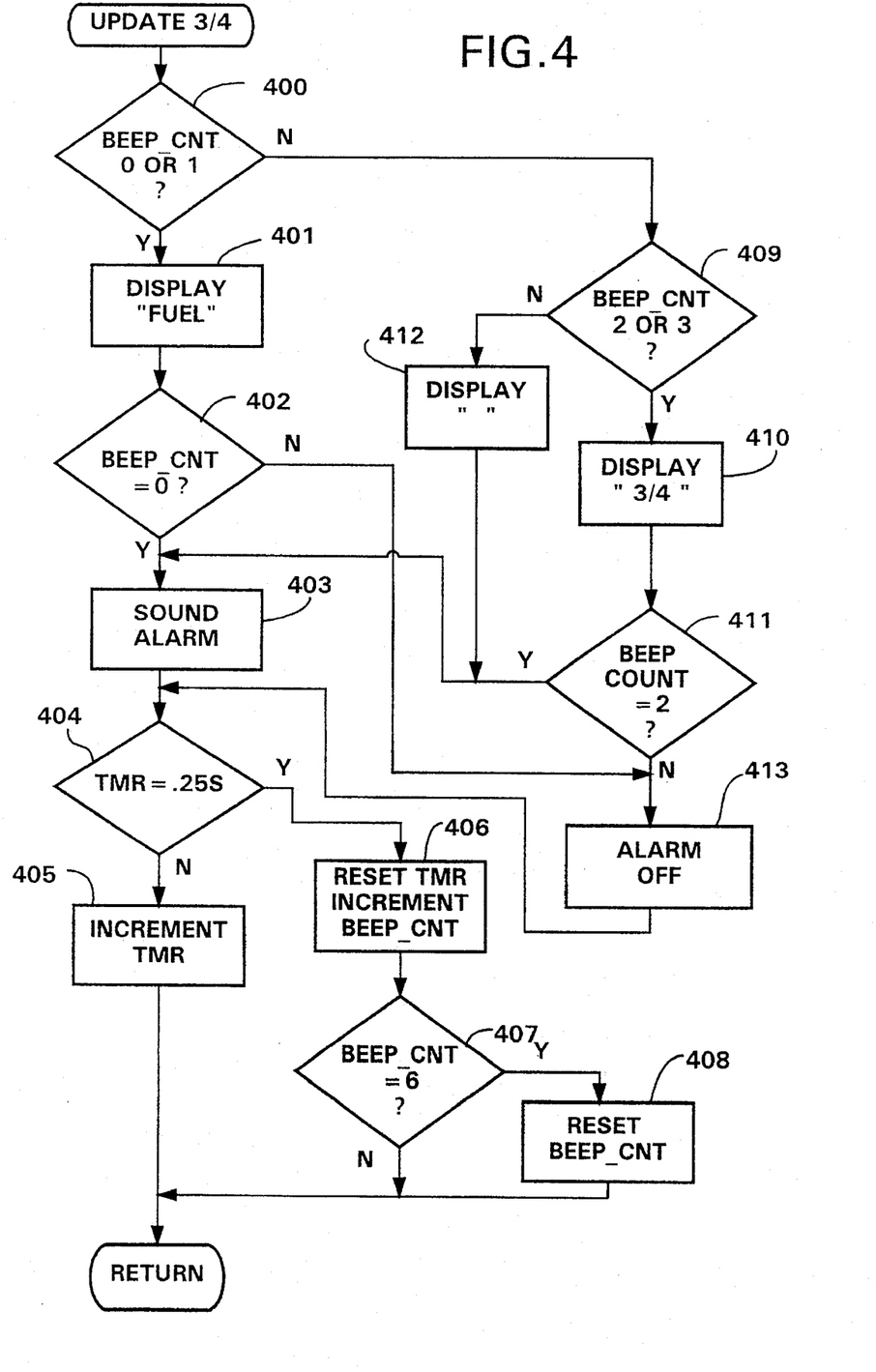

The Update 3/4 Display and Alarm routine is shown in FIG. 4. As long as the Fuel Fill routine is being executed and the tank is at least 3/4 full but less than 7/8 full, the updating routine causes the sounding of an alarm and the display of a multiple word message, the words being displayed in sequence. The pattern is as follows:

| Time    | Sound | Display |
|---------|-------|---------|
| .25 sec | ON    | FUEL    |
| .25 sec | OFF   | FUEL    |
| .25 sec | ON    | 3/4     |
| .25 sec | OFF   | 3/4     |
| .25 sec | OFF   | (blank) |
| .25 sec | OFF   | (blank) |

The sound pattern is divided into 0.25 sec intervals and the pattern is repeated after each six intervals. A timer TMR times the 0.25 sec intervals and a counter BEEP CNT counts the number of intervals.

TMR is tested at step 404 each time the update routine is executed. If 0.25 sec has not elapsed TMR is incremented before a return is made to the MAIN routine. If 0.25 sec has elapsed, TMR is reset at step 406 and BEEP_CNT is incremented. BEEP CNT is tested at step 407 and if it contains a count of 6 it is reset to zero before a return is made to the MAIN program.

When the 3/4 alarm flag is set to cause entry into the 3/4 update routine, BEEP_CNT is tested at step 400 to see if it contains 0 or 1. Initially, the count will be zero. Step 401 is executed during which the microprocessor sets output signals to the display 44 so that the word FUEL is displayed.

BEEP_CNT is tested at step 402 to see if it contains a count of zero. Since it does, the microprocessor sets an output to energize the audible alarm 50.

TMR is then tested and since 0.25 sec has not elapsed, TMR is incremented (step 405) and a return is made to the MAIN routine with the alarm sounding and the display showing the word "FUEL".

The ¾ alarm flag remains set as long as the tank is less than ⅞ths full so that the updating routine 206 is entered each time the main program reaches step 205. Steps 400–404 are carried out as described above until 0.25 sec elapses. When this occurs the TMR is reset and BEEP_CNT is incremented to one (step 406). On the following execution of the update routine the test at step 402 shows that BEEP_CNT no longer contains a count of zero so the output signal for sounding the alarm is terminated (step 413) before the timer is again tested at step 404. However, display 44 is still energized to display the word "FUEL".

After the second 0.25 interval has elapsed, a test of TMR at step 404 will prove true and TMR is reset at step 406 and BEEP_CNT incremented to a count of 2.

On the next pass through the updating routine the test at step 400 proves false but the test at step 409 proves true because BEEP_CNT contains a count of 2. Step 410 sends signals to display 44 so that it begins displaying "¾". Since BEEP_CNT contains a count of 2 the test at step 411 proves true so that the alarm is turned on (step 403) before TMR is again tested.

After a third 0.25 second interval has elapsed, step 404 will again cause a branch to step 406 to reset TMR and increment BEEP_CNT to a count of 3. On the following pass through the updating routine the test at step 400 will again prove false while the test at step 409 will again prove true so that step 410 causes continued energization of display 44 to display " ¾". However, since BEEP_CNT now contains a count of 3, the test at step 411 proves false so the audible alarm 50 is again turned off at step 413 before TMR is again tested.

After a fourth 0.25 sec interval has elapsed, the test at step 404 again proves true so TMR is again reset and BEEP_CNT is incremented (step 406) so that it contains a count of 4. On the following pass through the updating routine, the tests at step 400 and 409 both prove false so signals are sent to the display (step 412) to blank the display before TMR is again tested at step 404. Since the audible alarm was turned off at the end of the third 0.25 sec interval and has not been subsequently energized, it remains off.

After a fifth 0.25 sec interval has elapsed the test at step 404 again proves true. TMR is again reset and BEEP_CNT is incremented to 5. During the next 0.25 sec the tests at steps 400 and 409 again prove false so step 412 blanks the display before TMR is tested.

At the end of a sixth 0.25 sec interval the test at test 404 again proves true. TMR is reset at step 406 and BEEP_CNT is incremented to 6. When step 407 tests BEEP_CNT for a value of 6, the test proves true. BEEP_CNT is then reset at step 408. TMR and BEEP_CNT are now both back at their initial conditions ready to control another cycle of the alarm and display pattern. The routine cycles the alarm and display as long as the ¾ alarm flag is set.

The Update ⅞ Display and Alarm routine is not shown in the drawing but the implementation thereof should be obvious from the Update ¾ routine of FIG. 4. Since the alarm is continuously sounded once the tank is ⅞ths full a routine like the update routine of FIG. 4 may be used by modifying it so that steps 402, 411 and 413 are eliminated and step 403 is executed after step 401, 410 or 412. Obviously, other arrangements may be used for the ⅞ths update routine.

In summary, the present invention provides a novel method and apparatus for monitoring a vehicle fuel fill operation by providing distinctive audible alarms and visual messages as various fill levels are reached by the fuel in the vehicle tank. The invention may be implemented with minimal expense and few additional parts if incorporated into existing microprocessor-based instrumentation packages currently available for many tractors. Incorporation of the invention into such packages will not materially reduce the frequency at which the microprocessor senses status conditions during vehicle operation since it is effectively bypassed when the vehicle is moving.

While a preferred embodiment of the invention has been described in specific detail, it will be understood that various substitutions and modifications may be made in the described embodiment without department from the spirit and scope of the invention as defined by the appended claims.

We claim:

1. A fuel fill monitoring system for monitoring the filling of a vehicle tank of a vehicle with fuel, said system comprising:

first means for repeatedly sensing the level of fuel in said tank;

means for determining a base low fuel level;

second means responsive to said first means for determining when the level of fuel in said tank has increased from said base low fuel level by a given fraction of the total capacity of said tank;

third means responsive to said first and second means for setting a first indicator when the level of fuel reaches a first level less than a second level but substantially greater than said given fraction of the total capacity of said tank;

fourth means responsive to said first and second means for resetting said first indicator and setting a second indicator when the level of fuel reaches said second level; and alarm means responsive to said first indicator for giving a first warning and responsive to said second indicator for giving a second warning different from said first warning.

2. A fuel fill monitoring system as claimed in claim 1 wherein said vehicle includes a ground speed sensing means, and inhibit means responsive to said ground speed sensing means for inhibiting said first, second, third and fourth means whereby no warning is given by said alarm means if said vehicle is moving.

3. A fuel fill monitoring system as claimed in claim 2 wherein said inhibit means includes means for inhibiting said first, second, third and fourth means when said vehicle is moving and for a predetermined interval after the vehicle stops moving.

4. A fuel fill monitoring system as claimed in claim 1 and further comprising means responsive to actuation of a manual switch for inhibiting said alarm means.

5. A fuel fill monitoring system as claimed in claim 1 wherein said alarm means comprises an audible alarm and a visual display.

6. A fuel fill monitoring system for monitoring the filling of a tank with fuel, said system comprising:

sensor means for sensing the level of fuel in said tank and producing a single analog output signal having a magnitude indicating said level;

an analog to digital converter responsive to said analog output signal for producing a digital representation of said level;

a microprocessor including fill recognition means responsive to said digital representation for determining when said tank is being filled and first means responsive to said digital representation for determining when a volume of fuel sufficient to fill a given fraction of the total capacity of said tank has been placed in the tank, said fill recognition means further including a means for determining a base low fuel level in said tank and for comparing this with a present fuel level in said tank for determining when said fuel level is rising and, therefore, said tank is being filled;

alarm means for sounding an audible alarm, said microprocessor means including second means for sounding said alarm means in a first pattern when said fill recognition means determines that said tank is being filled and when more than a first fraction but less than a second fraction of the total capacity of said tank is filled with fuel and sounding said alarm means in a second pattern when at least said second fraction of the total capacity of said tank is filled with fuel.

7. A fuel fill monitoring system as in claim 6 wherein said fill recognition means is for determining when a predetermined volume of fuel has been added to said tank to increase said volume from said base low fuel level a given fraction of the total capacity of the tank to thereby provide an indication that the tank is being filled.

8. A fuel fill monitoring system as claimed in claim 6 wherein said second means comprises means for generating a first signal for sounding said alarm means in said first pattern, said first signal comprising groups of pulses, the pulses within a group being spaced by a first interval of time and succeeding groups of pulses being separated from a last pulse of a preceding group by a second interval of time different from said first interval of time.

9. A fuel fill monitoring system as claimed in claim 6 and further comprising a display means, said microprocessor including a third means for controlling said display means to display a first message concurrently with the sounding of said alarm means in said first pattern and to display a second message concurrently with the sounding of said alarm means in said second pattern.

10. A fuel fill monitoring system as claimed in claim 9 wherein said third means comprises means controlling said display means to sequentially flash plural word messages one word at a time, one word of said messages indicating the level of fuel in said tank.

* * * * *